United States Patent [19]

Dight et al.

[11] Patent Number: 5,023,220

[45] Date of Patent: Jun. 11, 1991

[54] ULTRA HIGH ZEOLITE CONTENT FCC CATALYSTS AND METHOD FOR MAKING SAME FROM MICROSPHERES COMPOSED OF A MIXTURE OF CALCINED KAOLIN CLAYS

[75] Inventors: Lawrence B. Dight, Annandale; David C. Bogert, Tinton Falls; Mark A. Leskowicz, Colonia, all of N.J.

[73] Assignee: Engelhard Corporation, Iselin, N.J.

[21] Appl. No.: 538,606

[22] Filed: Jun. 13, 1990

Related U.S. Application Data

[63] Continuation of Ser. No. 272,189, Nov. 16, 1988, abandoned.

[51] Int. Cl.$^5$ .................. B01J 29/08; B01J 21/16
[52] U.S. Cl. ........................... 502/65; 502/68; 502/79
[58] Field of Search ................. 502/68, 79, 65

[56] References Cited

U.S. PATENT DOCUMENTS

| | | | |
|---|---|---|---|
| 3,458,454 | 7/1969 | Lapides et al. | 502/68 |
| 3,515,511 | 6/1970 | Flank | 502/68 |
| 3,533,962 | 10/1970 | Cosgrove | 502/68 |
| 3,647,718 | 3/1972 | Haden, Jr. et al. | 502/68 |
| 4,235,753 | 11/1980 | Brown et al. | 252/552 |
| 4,465,779 | 8/1984 | Occelli et al. | 502/68 |
| 4,493,902 | 1/1985 | Brown et al. | 502/68 |
| 4,631,262 | 12/1986 | Altomare | 502/68 |

FOREIGN PATENT DOCUMENTS 0117545 5/1984 European Pat. Off. .
0194101 10/1986 European Pat. Off. .

Primary Examiner—Carl F. Dees

[57] ABSTRACT

A method for increasing the zeolite content of high zeolite content clay derived microspheres obtained by reacting porous precursor microspheres with a sodium silicate solution in the presence of seeds to crystallize zeolite Y in situ in macropores of precursor microspheres composed of a mixture of metakaolin and kaolin calcined to undergo the exotherm. The increased zeolite content is achieved by increasing macroporosity of the precursor microspheres and increasing the content of metakaolin in the precursor microspheres. The increase in zeolite is associated with an increase in catalytic activity and unexpectedly improved selectivity.

23 Claims, 2 Drawing Sheets

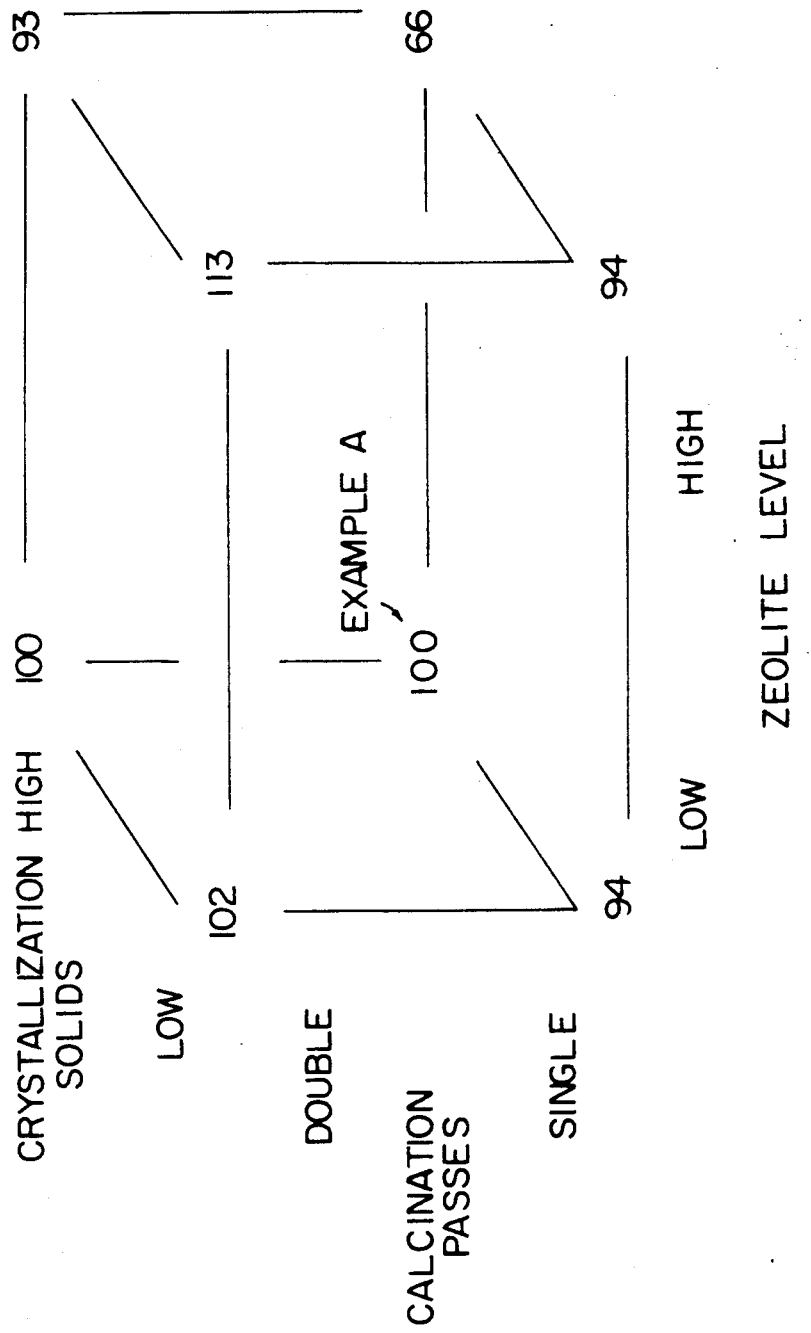

ULTRA HIGH ZEOLITE CONTENT FCC CATALYSTS AND METHOD FOR MAKING SAME FROM MICROSPHERES COMPOSED OF A MIXTURE OF CALCINED KAOLIN CLAYS

This is a continuation of co-pending application Ser. No. 07/272,189, filed on Nov. 16, 1988, now abandoned.

BACKGROUND OF THE INVENTION

The present invention relates to improvements in fluid cracking catalysts obtained by synthesizing high contents of zeolite Y in situ within macropores of silica-alumina microspheres composed of a mixture of calcined reactive kaolin clays, and preferably blending the high zeolite content microspheres with functional additives, such as activity adjusting microspheres, as described in U.S. Pat. No. 4,493,902. In particular, the invention provides an economically attractive means for increasing the zeolite content of the zeolitic microspheres, thereby increasing the activity of this component and permitting the use of larger amounts of the relatively less expensive functional additives and, preferably, resulting in cracking catalyst blends having improved selectively when used to crack petroleum feedstocks to produce transportation fuels.

U.K. No. 1,271,450 and 1,342,977 (e.g., EXAMPLES 2 and 4 of the latter) illustrate the preparation of cracking catalysts particles containing synthetic faujasite in the 50–200 micron size range by spray drying an aqueous slurry of raw kaolin, calcining the spray dried particles at 1300° F. (or at 1000° F. and then at 1300° F.) to convert the kaolin to metakaolin, mixing the particles with a sodium silicate-sodium hydroxide solution, adding seeds and refluxing to crystallize the zeolite. U.S. Pat. No. 3,377,006 teaches the preparation of pure zeolite Y by reaction of finely divided metakaolin with sodium silicate in the presence of seeds. Kaolin calcined through the exotherm is not utilized in practice of any of these prior art processes and the significant benefits we have observed that result from including this form of calcined clay in the reaction mixture would not be realized by the prior art.

The following are illustrative of patents that disclose the use of kaolin calcined through the exotherm, alone or with metakaolin, in zeolite synthesis, including in situ zeolite synthesis by reaction of a calcined clay with sodium hydroxide solution; generally the processes result in relatively low levels, e.g., 20-30%, of sodium zeolite Y.

U.S. Pat. No. 3,367,886
U.S. Pat. No. 3,367,887
U.S. Pat. No. 3,506,594
U.S. Pat. No. 3,647,718
U.S. Pat. No. 3,657,154
U.S. Pat. No. 3,663,165
U.S. Pat. No. 3,932,268

U.S. Pat. No. 4,235,753 discloses a process for crystallizing zeolite Y in microspheres by hydrothermal reaction between microspheres composed of metakaolin and separate microspheres composed of kaolin calcined through the exotherm by reaction with sodium hydroxide solution in the presence of seeds. Illustrative examples indicate the crystallized products contained a maximum of 30% zeolite, although the patent mentions crystallized products containing 2 to 75%, and most preferably 10-50% zeolite.

U.S. Pat. No. 4,493,902, the teaching of which are incorporated herein by cross-reference, discloses novel fluid cracking catalysts comprising attrition-resistant, high zeolite content, catalytically active microspheres containing more than about 40%, preferably 50°–70% by weight Y faujasite and methods for making such catalysts by crystallizing more than about 40% sodium Y zeolite in porous microspheres composed of a mixture of two different forms of chemically reactive calcined clay, namely, metakaolin (kaolin calcined to undergo a strong endothermic reaction associated with dehydroxylation) and kaolin clay calcined under conditions more severe than those used to convert kaolin to metakaolin, i.e., kaolin clay calcined to undergo the characteristic kaolin exothermic reaction, sometimes referred to as the spinel form of calcined kaolin. In a preferred embodiments, the microspheres containing the two forms of calcined kaolin clay are immersed in an alkaline sodium silicate solution which is heated, preferably until the maximum obtainable amount of Y faujasite is crystallized in the microspheres.

In practice of the '902 technology, the porous microspheres in which the zeolite is crystallized are preferably prepared by forming an aqueous slurry of powdered raw (hydrated) kaolin clay ($Al_2O_3:2SiO_2: 2H_2O$)) and powdered calcined kaolin clay that has undergone the exotherm together with a minor amount of sodium silicate which acts as fluidizing agent for the slurry that is charged to a spray dryer to form microspheres and then functions to provide physical integrity to the components of the spray dried microspheres. The spray dried microspheres containing a mixture of hydrated kaolin clay and kaolin calcined to undergo the exotherm are then calcined under controlled conditions, less severe than those required to cause kaolin to undergo the exotherm, in order to dehydrate the hydrated kaolin clay portion of the microspheres and to effect its conversion into metakaolin, this resulting in microspheres containing the desired mixture of metakaolin, kaolin calcined to undergo the exotherm and sodium silicate binder In illustrative examples of the '902 patent, about equal weights of hydrated clay and spinel are present in the spray dryer feed and the resulting calcined microspheres contain somewhat more clay that has undergone the exotherm than metakaolin. The '902 patent teaches (col. 8) that the calcined microspheres comprise about 30-60% by weight metakaolin and about 40-70% by weight kaolin characterized through its characteristic exotherm It is to be noted that no metakaolin is present in the spray dryer feed used in the preferred manufacturing process described in the '902 patent. A less preferred method described in the patent at column 6, involves spray drying a slurry containing a mixture of kaolin clay previously calcined to metakaolin condition and kaolin calcined to undergo the exotherm but without including any hydrated kaolin in the slurry, thus providing microspheres containing both metakaolin and kaolin calcined to undergo the exotherm directly, without calcining to convert hydrated kaolin to metakaolin However, the patent teaches that less attrition zeolitized microspheres are produced by this approach.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as hardness (attrition-resistance).

EPA No. 0,194,101, published Sep. 10, 1986 which claims priority from U.S. Ser. No. 707,635, 707,362, and 750,813, all now abandoned, describes variations of the ion-exchange treatment applied to the sodium form high zeolite content microspheres of the '902 patent to provide so-called "octane" catalysts, the zeolite component of which is characterized by having a low sodium content, reduced unit cell size and the absence of rare earth or the permissible presence of minimal amounts of rare earth These known variations of zeolite Y faujasite are frequently referred to as stabilized and/or ultrastabilized zeolite Y. Hereinafter the various stabilized forms of zeolite Y, e.g., calcined H-Y, H-Re-Y, will be called ultrastabilized Y which now has a broader meaning than the original term which was limited to zeolite Y having unit cell size below 24.45 Angstrom units.

As described in the above-cited '902 patent and EPA '101, the high zeolite content, high activity microspheres are adapted to be blended with lower activity functional additives such as microspheres composed of calcined kaolin clay and/or microspheres containing a vanadium immobilizing agent, a preferred form of the latter being the magnesia-enriched calcined kaolin clay microspheres described in EPA 06/937,457, the teachings of which are incorporated herein by cross-reference. In some cases blends may include other catalytic microspheres which function to adjust activity, selectivity or both.

The zeolite content of the crystallized microspheres is determined by X-ray diffraction from the zeolite which is best performed on the sodium form crystallized microspheres Conventional chemical analytical techniques are not deemed to be applicable to the determination of the zeolite content of materials in which the zeolite is crystallized in situ in a silica-alumina matrix which cannot be readily physically or chemically isolated. In practice, it has been found that the apparent amount of zeolite crystallized from any given formulation using the '902 technology can vary, depending on the history of raw material, processing conditions and proportions and concentrations of reagents. The zeolite content (sodium form) of crystallized microspheres range from 44% to 72% in illustrative examples of the '902 patent. Commercial production and laboratory preparations typically result in the crystallization of a maximum of about 55-60% zeolite (sodium form). Since at least a substantial proportion of the zeolite grows in macropores of the precursor porous microspheres, it might be expected that simply increasing macroporosity of the precursor microspheres would result in the generation of higher levels of zeolite because more space would be available in which to grow zeolite crystals.

Surprisingly, merely providing more room for crystal growth by increasing macroporosity will not achieve this result.

The aforementioned technology has met widespread commercial success Because of the availability of high zeolite content microspheres which are also attrition-resistant, custom designed catalysts are now available to oil refineries with specific performance goals, such as improved activity and/or selectivity without incurring costly mechanical redesigns. A significant portion of the FCC catalysts presently supplied to domestic and foreign oil refiners is based on this technology. Refineries whose FCC units are limited by the maximum tolerable regenerator temperature or by air blower capacity seek selectivity improvements resulting in reductions in coke make while the gas compressor limitations make catalysts that reduce gas make highly desirable Seemingly a small reduction in coke can represent a significant economic benefit to the operation of an FCC unit with air blower or regenerator temperature limitations Improvements in cracking activity and gasoline selectivity of cracking catalysts do not necessarily hand in hand. Thus, a cracking catalyst can have outstandingly high cracking activity, but if the activity results in a high level of conversion to coke and/or gas at the expense of gasoline the catalyst will have limited utility. Catalytic cracking activity in present day FCC catalysts is attributable to both the zeolite and nonzeolite (e.g., matrix) components. Zeolite cracking tends to be gasoline selective. Matrix cracking tends to be less gasoline selective. After appropriate ion-exchange treatments with rare earth cations, high zeolite content microspheres produced by the in situ procedure described in the '902 patent are both highly active and highly gasoline selective. As zeolite content of these unblended microspheres is increased, both activity and selectivity tend to increase. This may be explained by the decrease in matrix content with increase in zeolite content and the decreasingly prominent role of nonselective matrix cracking. Thus, increases in the zeolite content of the high zeolite content microspheres are highly desirable.

Octane catalysts present a major drive for the supply of zeolite catalysts of increased activity without detriment to selectivity and hardness An increasingly large proportion of the FCC catalyst being used at present is represented by so-called "octane catalysts" which are formulated to boost the octane of the FCC gasoline fraction of the cracked oil feedstock. Generally, octane catalysts are of the ultrastable zeolite Y type and are prepared by post treating zeolite Y, synthesized in sodium form, to exchange sodium with ammonium and/or hydrogen followed by a thermal treatment that reduces unit cell size of the zeolite, resulting in so-called ultrastabilized zeolite. Frequently, multiple exchanges and calcinations are used. Metal ions such as rare earth ions which contribute to hydrogen transfer reactions are not present or are present in limited amounts.

Known treatments used to provide octane catalysts by providing ultrastabilized zeolite invariably tend to result in catalysts that are less active than and less gasoline selective than similar catalysts ion-exchanged with rare earth. It has been found that this is generally also true of stabilized octane catalysts prepared by the '902 technology. Octane version of these catalysts are both less active than and less gasoline selective than the high rare earth content counterparts of the '902 patent. It has been found that laboratory based data in EPA No. 0,194,101 has been found that priority documents are not consistently reproducible.

Consequently, the desirability of increasing the activity of the high zeolite content microspheres of the '902 patent is especially significant when applying downstream processing to prepare ultrastabilized octane catalysts. Because increases in zeolite content is generally associated with increases in cracking activity, as discussed above, the desirability of increasing the levels of zeolite in higher zeolite content microspheres without significantly impairing attrition-resistance or selectivity would represent a significant technological advance.

In view of the commercial importance of FCC catalyst blends based on high zeolite content microspheres, especially but not limited to octane catalysts, there has been a continuing search for means to produce high zeolite content microspheres having increased cracking activity without sacrifice in selectivity and thermal stability, and preferably having improved activity and selectivity. This present invention is a result of these searches.

THE INVENTION

We have discovered an economically attractive method for increasing the zeolite content of high zeolite content clay derived microspheres obtained by reacting precursor microspheres composed of a mixture of metakaolin and kaolin calcined to undergo the exotherm with a sodium silicate solution to crystallize zeolite Y in situ in macropores of the precursor microspheres. The increase in zeolite content is activity and associated with a desirable increase in catalytic seems to improve selectivity Improvements in activity and selectivity, specifically a reduction in coke and/or gas make is desirable for reasons pointed out above. Reductions in coke or gas make or both serves the needs of refiners whose FCC units are limited by regenerator temperature, air blower and/or gas compressors.

The invention, in one aspect, relates to the resulting novel ultrahigh zeolite content catalysts, including ultrahigh zeolite content octane catalysts. The invention, in another aspect, relates to the preparation of the novel catalysts. Another aspect of the invention relates to the use in conventional FCC units of the novel catalysts, preferably blended with lower activity microspheres. In an especially valuable embodiment of the invention, the new high zeolite content microspheres are post treated to provide ultrastabilized octane catalysts by exchanging the sodium form microspheres with ammonium ions, followed by calcination, preferably followed by further exchange with ammonium ions and a second calcination to produce stabilized forms of the zeolite.

The novel zeolite microspheres of the invention are produced by novel processing, which is a modification of technology described in the '902 patent, and involves increasing the proportion of calcined clay in the form of metakaolin to kaolin calcined to undergo the exotherm in the porous precursor microspheres in which zeolite Y is crystallized while also increasing the macroporosity of the precursor microspheres, the increase in macroporosity preferably being achieved by increasing the ratio of calcined clay to hydrated clay in the slurry that is spray dried to produce the porous precursor microspheres. In this manner, we have alleviated both spatial and nutritional limitations to the growth of zeolite Y and therefore are able to crystallize ultrahigh levels of zeolite (e.g , ca. 75%). Known post-zeolite synthesis processing (ion-exchange, etc.) may be practiced to produce octane versions of our catalysts.

The higher zeolite to matrix surface area ratio of the catalyst of the invention is believed to be responsible for the improved activity and selectivity of the zeolite microspheres of the invention since the zeolite provides the bulk of the cracking activity and the matrix, now present in reduced amounts, tends to promote gas and coke make.

The accompanying FIG. 1, left, shows a general processing scheme for two variants of an octane catalyst prepared by prior art (indicated by Catalyst A and Catalyst A'); at the right a general processing scheme for producing an octane catalyst of the invention, Catalyst B, is illustrated.

The accompanying FIG. 2 summarizes the activity of blended catalysts A and A' and Catalyst B as function of crystallization solids and calcination method.

DETAILED DESCRIPTION

Figure 1:
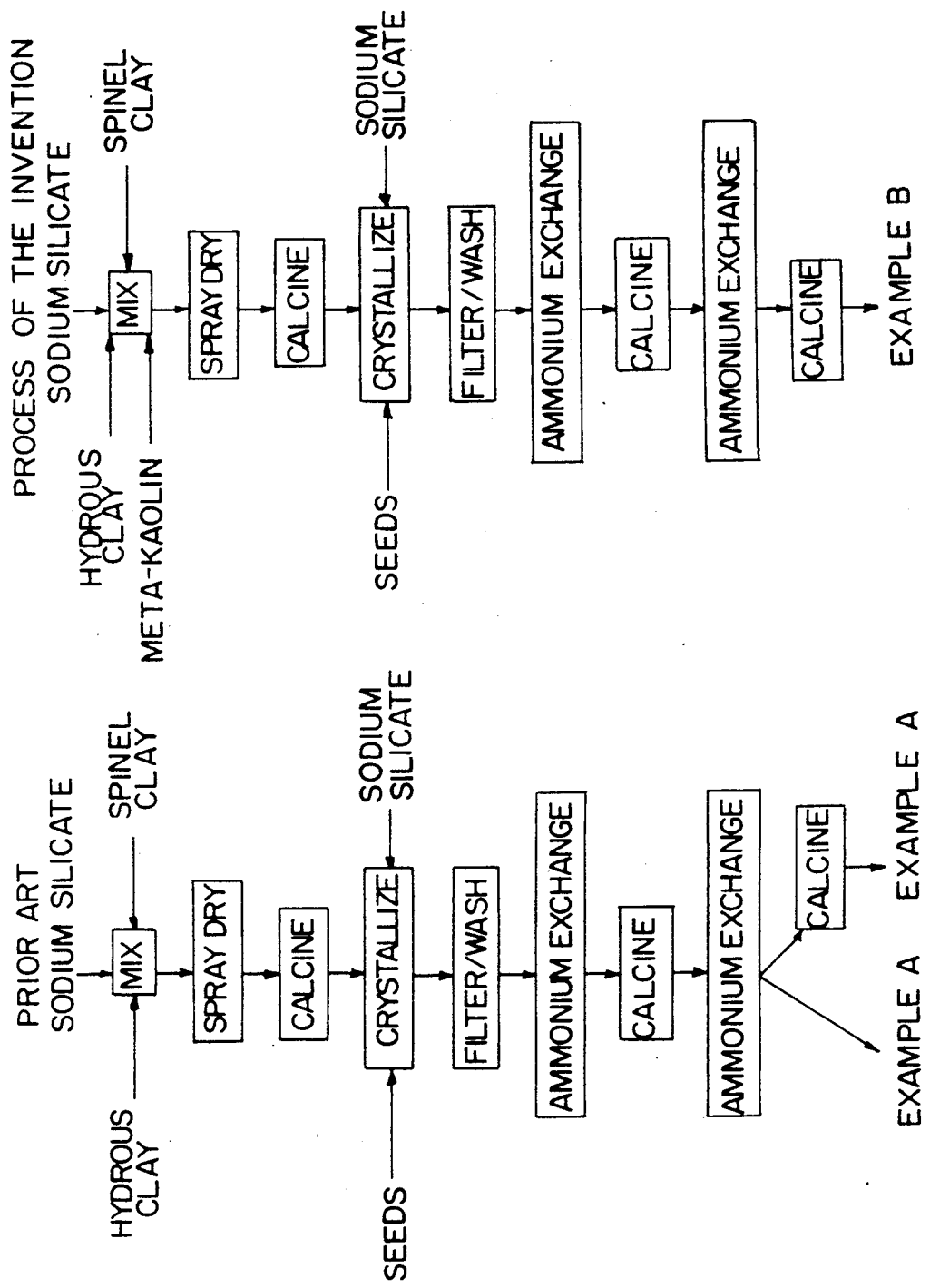

As shown in FIG. 1, Catalysts A and A' are made from precursor porous microspheres A, composed of a mixture of about equal weight proportions of metakaolin and kaolin calcined to undergo the exotherm, which are reacted with seeds and an alkaline sodium silicate solution. The microspheres are crystallized to the maximum zeolite content possible (typically ca. 55–60%), filtered, washed, ammonium exchanged, calcined and exchanged a second time with ammonium ions. A variation of Catalyst A, Catalyst A', is made with a two step calcination and ammonium exchange of the same crystallized microspheres used to make Catalyst A.

The octane catalyst of the invention, Catalyst B, is made from modified precursor microspheres (B) which contain both greater amounts of metakaolin and macroporosity than microspheres (A). The content of metakaolin in the precursor microspheres is measured by an acid-solubility test, described hereinafter in detail. Increases in metakaolin content are reflected by increases in acid solubility as measured by this test. Metakaolin has appreciable acid solubility, but kaolin calcined through the exotherm has negligible or minimal acid-solubility.

In accordance with the present invention, the slurries that are spray dried to produce porous microspheres in which zeolite Y is crystallized by the known reaction of the porous microspheres with sodium silicate solution in the presence of seeds contain powdered kaolin that has been calcined to undergo the exotherm and hydrated kaolin clay or a mixture of hydrated kaolin clay and metakaolin such as to result in spray dried microspheres which, after calcination, have the following properties.

|  | Preferred | Permissible |
|---|---|---|
| Hg pore volume, cc/g | 0.56–0.62 | 0.50–0.70 |
| Acid solubility, % | 25–31 | 22–42 |
| Recommended proportions are: | | |
| Kaolin calcined through exotherm, wt % | 30–40 | 0–50 |
| Sodium silicate binder, wt %* | 10–12 | 8–15 |
| Metakaolin | Relative amounts of hydrated kaolin and metakaolin to be varied to result in microspheres which, after calcination, have the acid solubility and pore volume properties listed above: | |
| Hydrated Kaolin | | |

*Calculated on a water-free basis.

Because the modified microspheres are based on a four component system, a change in the percentage of one of the components can be balanced by a change in any or all of the other components, as shown above. For the permissible ranges stated for percentages of components, any combination that yields microsphere properties (acid solubility and Hg porosity) within the limits stated as permissible can be used to make the ultrahigh zeolite content product. Porosities and solubilities on the low side of the preferred values, however, make the high zeolite level somewhat more difficult to reach, while porosities on the high side of the preferred values generally result in a finished product that is less attrition resistant than the optimum case.

Especially preferred compositions of the solids in slurry which is spray dried to form porous microspheres precursors having the desired acid solubility and porosity set forth above are:

|  | Weight %, dry weight basis | |
| --- | --- | --- |
|  | Especially Preferred | Preferred |
| Hydrated kaolin | 9 | 5–35 |
| Metakaolin | 45 | 17–53 |
| Kaolin calcined through the exotherm | 35 | 30–40 |
| Sodium Silicate Binder | 11 | 10–12 |

Thus, the preferred porous microspheres in which the zeolite is crystallized comprise, before the crystallization reaction, an excess of metakaolin clay relative to kaolin calcined through the exotherm e.g., from about 1.2 to 2 parts by weight metakaolin to one (1) part by weight kaolin calcined through the exotherm. Especially preferred is a ratio of about 1.5. The calcined microspheres preferably contain no hydrated clay, the presence of which is detectable by X-ray diffraction.

During the crystallization process, alumina and silica of the clay microspheres is leached from those microspheres, leaving a non-zeolite component. This non-zeolite component may, therefore, be referred to as the "zeolite crystallization process residue of calcined clays". In the process of the invention, this residue includes that derived from kaolin calcined through the exotherm which, as mentioned, contribute to stability of the zeolite.

A commercial source of powdered kaolin calcined through the exotherm, e.g., SATINTONE® No. 1 calcined kaolin, may be used in the preferred process for forming the microspheres composed of kaolin calcined through its exotherm and metakaolin Alternatively, finely divided hydrated kaolin clay (e.g., ASP®600, a commercially available hydrated kaolin clay described in Engelhard Technical Bulletin No. TI-1004, entitled "Aluminum Silicate Pigments" (EC-1667)) may be converted to this state by calcining the kaolin at least substantially completely through its characteristic exotherm. (The exotherm is detectable by conventional differential thermal analysis, DTA.) For example, a one inch bed of the hydrated kaolin clay may be calcined for about 1-2 hours in a muffle furnace at a chamber temperature of about 1800°-1900° F. to produce clay that has been calcined through its characteristic exotherm, preferably without any substantial formation of mullite.

During calcination, some of the finely divided clay agglomerates into larger particles. After completion of calcination, the agglomerated clay calcining is pulverized into finely divided particles.

A commercial source of metakaolin, e.g., SP33 ™, may be used or a hydrated kaolin, e.g., ASP® 600 may be calcined as described above except using a lower temperature, e.g., a temperature of about 1350° F. for a sufficient time e.g., 2 hours, to dehydrate the kaolin and convert it into metakaolin. SP33 clay is similar to the calcined kaolin clay supplied under the registered trademark SATINTONE® 2.

The hydrated kaolin clay component of the especially preferred feed slurry is suitably ASP 600 kaolin.

Preferably, all the clay, hydrated and calcined, is a low iron content, purified grade of clay. Purified water-processed kaolin clays from Middle Georgia have been used with success.

In a preferred embodiment of the invention an aqueous slurry of finely divided hydrated kaolin clay, metakaolin and clay that has been calcined through its characteristic exotherm and sodium silicate binder is prepared. The aqueous slurry is then spray dried to obtain microspheres comprising a sodium silicate bonded mixture of hydrated clay, metakaolin and clay that has been calcined at least substantially through its characteristic exotherm. The microspheres have average particle diameters that are typical of commercial fluid catalytic cracking catalysts, e.g., 65-85 microns. Suitable spray drying conditions are set forth in the '902 patent.

In practice of this invention, the solids content of the slurry fed to the spray dryer is preferably lower than that used in the prior art and is such that the weight of water to the weight of microspheres in the slurry is in the range of about 1.2 to 2.0. This results in slurries having a solids content (considering microspheres only) in the range of about 33 to 46 wt. %. Since, the slurry is of lower solids content and is formulated with more calcined clays than is used in practice of the prior art, the resulting spray dried microspheres consist of powdered solid components which are less densely packed, this being evidenced by increased macroporosity (pore diameters in the range of 600 to 20,000 Angstrom units as measured by Hg porosimetry).

After spray drying, the microspheres are calcined at a temperature and for a time (e.g., for 2 hours in a muffle furnace at a chamber temperature of about 1350° F.) sufficient to convert the hydrated clay component of the microspheres to metakaolin, leaving the previously calcined clay components of the microspheres essentially unchanged. The resulting calcined porous microspheres comprise a mixture of metakaolin and kaolin clay calcined through its characteristic exotherm in which the two types of calcined clay are present in the same microspheres Most preferably, the calcined microspheres comprise about 50 to 57% by weight metakaolin and about 35% by weight kaolin clay that has been calcined through its characteristic exotherm The balance is $Na_2O$ and $SiO_2$ derived from sodium silicate. The calcined microspheres may include small amounts of mullite (which can be detected by X-ray analysis).

To carry out the crystallization step in which sodium faujasite is crystallized within pore of the calcined microspheres, the calcined clay microspheres are mixed with one or more sources of sodium silicate, sodium hydroxide and water to form a fluid slurry. Preferably, a sodium silicate diluted solution of amorphous zeolite seed ("quenched seed") is also added to the slurry. See U.S. Pat. No. 4,631,262, the teachings of which are incorporated herein by cross-reference. Preferably, the resulting slurry contains: (a) molar ratio of $Na_2O/SiO_2$ in the solution phase of about 0.46 to 0.57; and (b) a weight ratio of $SiO_2$ in the solution phase to microspheres of calcined clay of about 0.47 to 1.20. The preferred order of addition of reagents to a reactor involves initial addition of solution of seeds, followed by sodium silicate and then water. Microspheres composed of the mixture of calcined clays are added last If necessary, a solution of sodium hydroxide may be included in the slurry to adjust the $Na_2O$ in the solution phase to an appropriate level. When sodium hydroxide is used, it is preferable to add this material to the reactor after addition of the seeds. For example, sodium hydroxide solution can be added immediately after addition of sodium silicate and before addition of water. As used herein, the "solution phase" of the slurry shall include all the material added to the crystallization reactor (including the solution of sodium silicate diluted zeolite seeds) except the material constituting the calcined clay microspheres.

The following molar and weight ratios of constituents added to the crystallization reactor have provided satisfactory results (unless otherwise indicated the ratios given are molar ratios).

| Solution Phase $Na_2O$/ Solution Phase $SiO_2$ | wt. Solution Phase $SiO_2$/ wt. Microspheres |
|---|---|
| 0.57 | 0.46 |
| 0.51 | 0.64 |
| 0.46 | 1.20 |

The molar ratios of all the constituents present in the crystallization reactor at the commencement of the crystallization process typically are within the following ranges:

| $Na_2O/SiO_2$ | $SiO_2/Al_2O_3$ | $H_2O/Na_2O$ |
|---|---|---|
| 0.30 to 0.40 | 4 to 8 | 20 to 35 |

A preferred weight ratio of water to calcined clay microspheres at the beginning of the crystallization process is about 2.1 to 4.4. In order to minimize the size of the crystallization reactor, it is preferred to maximize the amount of calcined kaolin clay microspheres added to the reactor and to minimize the amount of water present during the crystallization process. However, lower activity catalyst is produced in higher solids crystallizations, apparently as the result of crystallizing a lower Si/Al zeolite product. The level of crystallization solids is therefore a balance to make good activity material in the minimum size crystallization reactor.

Good crystallization was obtained when the constituents added to the crystallization reactor provided the following molar and weight ratios at the commencement of the crystallization process (unless otherwise indicated the ratios given are molar ratios):

| $Na_2O/SiO_2$ | $SiO_2/Al_2O_3$ | $H_2O/Na_2O$ | wt. $H_2O$/ wt. microspheres |
|---|---|---|---|
| 0.297 | 4.196 | 23.422 | 2.126 |
| 0.312 | 4.889 | 23.423 | 2.604 |
| 0.333 | 5.656 | 22.752 | 3.125 |
| 0.355 | 7.281 | 23.422 | 4.409 |

Crystallization may be carried out by heating the reactants in a reactor to a temperature within the range of about 200° to 215° F. for about 10 to 30 hours until the maximum zeolite content is developed while minimizing evaporation. Maximum zeolite content is determined by X-ray diffraction measurement; reaction is terminated when two consecutive XRD measurements of the zeolite content show no further growth is occurring.

After the crystallization process is terminated, the microspheres containing Y-faujasite are separated from at least a substantial portion of their mother liquor, e.g., by filtration. It may be desirable to wash the microspheres by contacting them with water either during or after the filtration step. The purpose of the washing step is to remove mother liquor that would otherwise be entrained within the microspheres.

The microspheres contain crystalline Y-faujasite in the sodium form. In order to obtain a product having acceptable catalytic properties, it is necessary to replace sodium cations in the microspheres with more desirable cations. This may be accomplished by contacting the microspheres with solutions containing ammonium or rare earth cations or both. The ion exchange step or steps are preferably carried out so that the resulting catalyst contains less than about 0.7%, most preferably less than about 0.3%, by weight $Na_2O$. After ion exchange, the microspheres are dried, preferably by flash drying, to obtain the microspheres of the present invention.

The preferred catalyst of the invention comprises microspheres containing at least and preferably more than 70% by weight Y-faujasite, most preferably at least 74% and most preferably more than 75% Y-faujasite as determined by X-ray measurements made on the as-crystallized sodium faujasite form zeolite. As used herein, the term Y-faujasite shall include synthetic faujasite zeolites exhibiting, in the sodium form, an X-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75A as determined by the technique described in the ASTM standard method of testing titled "Determination of the Unit Cell Size Dimension of a Faujasite Type Zeolite" (Designation D3942-80) or by an equivalent technique. The term Y-faujasite shall encompass the zeolite in its sodium form as well as in the known modified forms, including, e.g., rare earth and ammonium ion exchanged forms and stabilized forms. The percentage of Y-faujasite zeolite in the microspheres of the catalyst is determined when the zeolite is in the sodium form (after it has been washed to remove any crystallization mother liquor contained within the microspheres) by the technique described in the ASTM standard method of testing titled "Relative Zeolite Diffraction Intensities" (Designation D3906-80) or by an equivalent technique. It is important to equilibrate the microspheres carefully before X-ray evaluations are made since equilibration can have a significant effect on the results.

It is preferred that the Y-faujasite component of the microspheres, in their sodium form, have a crystalline unit cell size of less than about 24.73A and most preferably less than about 24.69A. Typically, the Y-faujasite component of the microspheres has a crystalline unit cell size of about 24.64–24.73A. We believe that a unit cell size range of between 24.64–24.73A corresponds to a $SiO_2Al_2O_3$ molar ratio of the Y-faujasite of about 4.1–5.2.

The following procedure is used to make improved octane catalyst of the invention. After the zeolite has crystallized, optionally silica retained (see U.S. Pat. No. 4,490,902) and the microspheres have been recovered, the sodium content of the zeolite is reduced in one or more stages comprising sequential ammonium exchange and calcination steps to form microspheres containing reduced cell size Y-faujasite. The overall sodium content should eventually be reduced to less than about 1.5% (based on the weight of the catalyst). In the laboratory, it was found desirable to conduct 2 ammonium exchanges on the dried catalyst prior to the first calcination step. Desirably, these exchanges are achieved by slurrying the catalyst at from about 30% by weight solids in a 180° F. 3N ammonium nitrate solution maintained at a pH in the neighborhood of 3.0 by addition of nitric acid and stirring for a period of time ranging from about 10 minutes to several hours.

After this ammonium exchange treatment, the microspheres are calcined in the presence of steam. Typically, the cell size of the zeolite as measured subsequent to the initial ion exchange and calcination step should be reduced by at least about 0.10 to 0.20 Angstrom units. The sodium content subsequent to the initial ammonium exchange will usually be around 3-4% (expressed as $Na_2O$ on a weight basis).

Typical calcination temperatures and times for the first calcination range from about 700° to about 1,200° F., preferably 800° to 1,100° F., more preferably 900° to 1,000° F., for from about 1 to 10 hours with provisoes that is important not to abuse the zeolite so severely that the cage structure collapses during calcining but it is important to calcine severely enough that residual sodium can be removed subsequently without triggering collapse of the zeolite cage structure during the subsequent ammonium exchanges. Calcining at 1,000° F. to 1,100° F. for about 2 hours in a laboratory muffle furnace seems to adequately satisfy both of these provisoes. About 15% by weight of added water seems to provide sufficient steam for the cell size reduction in closed systems. After the initial calcination step, the unit cell size of the zeolite is preferably in the range of from 24.69±0.02 to 24.60±0.02 Angstrom units.

After the first calcination, an additional ammonium exchange step should be carried out substantially as set forth above. Subsequent to these ammonium exchanges, it is preferred to calcine again at a temperature ranging from about 1,000° F. to about 1,200° F. preferably 1,000° to 1,100° F. even though an adequate calcination might in some cases be obtained in the regenerator of the FCC unit when the catalyst is added thereto. A separate calcination step is preferred as this seems to further stabilize the catalyst for any intermediate storage step and more importantly because control of humidity during calcining appears to be important in controllably stabilizing the zeolite and reducing unit cell size. A suitable combination of time, temperature and humidity is achieved on a laboratory scale by steaming at 1,000° F. for 2 hours in a covered system in the presence of the water retained from washing subsequent to ammonium exchange.

The resulting catalyst after this calcination should have a BET surface area of at least about 500 $m^2/g$, preferably over 550 $m^2/g$, usually less than 700 $m^2/g$, and most preferably in the range of from about 600 $m^2/g$ to about 650 $m^2/g$.

The volume of pores ranging in size from 2 to 10 nm in catalysts of this invention is, e.g., from about 0.02 to about 0.25 cc/g. In preferred embodiments of this invention, the volume of pores ranging from 2 to 10 nm (micropore volume) will be from about 0.05 to 0.20 cc/g, and the volume of pores with diameters ranging from 600 to 20,000 Angstrom units will be less than about 0.2 cc/g. In more preferred embodiments, the micropore volume will be from about 0.08 to about 0.15 cc/g, and in still more preferred embodiments, the micropore volume will be from about 0.08 to about 0.10 cc/g, while the total porosity (20 Angstrom plus) will be less than about 0.3 cc/g (or even less than 0.25 cc/g). Typical total porosity is about 0.25 cc/g.

In octane catalysts of this invention, the unit cell size of the Y-faujasite will be reduced by e.g. at least 0.03 Angstrom units, preferably at least about 0.05 Angstrom units, more preferably at least about 0.10 Angstrom units, from the initial cell size which is typically about 24.69 Angstrom units.

The sodium content of the octane catalyst of this invention is usually under 1.5% by weight based on the total weight of the catalyst including both zeolite and matrix. In preferred embodiments, the sodium content (as $Na_2O$) will be less than 1.0%, and more preferably less than 0.8%.

Octane catalyst according to this invention will often be calcined only once since the final calcination is obtained where the catalyst is added to the regenerator. In that case, the cell size is predominately controlled by the final $Na_2O$ 0.8% by weight, more preferably in the range of from about 0.25 to about 0.5% by weight. In the most preferred embodiments, the sodium content will be in the range of from about 0.3 to catalyst. The preferred catalysts of this invention will be prepared from starting materials containing Y-faujasite having a silica to alumina mole ratio in excess of 4.5, more preferably in excess of 4.8.

The following examples, given for illustrative purposes demonstrate the presently preferred procedures for the preparation of octane catalysts of the invention and show the advantages of the invention. Unless otherwise indicated, all proportions are on a dry weight basis.

EXAMPLE I

In this example, microspheres (A) comprising a mixture of a minor amount of metakaolin relative to kaolin calcined through the exotherm were prepared by the following prior art procedure:

A slurry was prepared by mixing 50 parts by weight of Satintone® No. 1 calcined kaolin (a commercially available finely divided kaolin clay that has been calcined through its characteristic exotherm without any substantial formation of mullite, described in the Engelhard Technical Bulletin entitled "Aluminum Silicate Pigments" identified above), 50 parts by weight of ASP® 600 hydrated high purity kaolin, 19.1 parts by weight of a sodium disilicate solution (analyzing 28.4% by weight $SiO_2$, 15.2% by weight $Na_2O$), and 107 parts by weight of $H_2O$. The slurry was spray dried in a commercial spray dryer and calcined in a rotary calciner under conditions estimated to correspond to calcination in a muffle furnace at 1350° F. for 2 hours using about a one inch bed of the spray dried microspheres in the muffle furnace. The calcination was carried out to convert the hydrated kaolin in the microspheres to metakaolin. Although equal weights of hydrated kaolin and kaolin calcined through the exotherm were used, calcination dehydrated the hydrated kaolin but not the previously calcined clay component. Therefore the resulting calcined microspheres contained slightly more kaolin calcined through the exotherm than metakaolin. In the tests described in the illustrative examples, batches of microspheres from different production runs were used.

Solutions of mature amorphous quenched seeds were prepared using the following ingredients:

| | | |
|---|---|---|
| Sodium aluminate | 169.5 g | (18.2% Na$_2$O, 3.9% Al$_2$O$_3$) |
| NaOH | 10.2 g | (24.77% NaOH) |
| Sodium silicate | 245.6 g | (27.2% SiO$_2$, 14.6% Na$_2$O, 0.1% Al$_2$O$_3$) |
| HFZ ® catalyst mother liquor concentrate | | |
| H$_2$O (deionized) | 82.7 g | |

One third of the sodium silicate and all of the water were weighed into a 1 liter Pyrex ® beaker. The sodium hydroxide and sodium aluminate were combined and poured into a 500 ml buret. The remaining sodium silicate was added to second 500 ml buret. These were pumped into the beaker at a controlled rate such that the rate of sodium silicate addition was greater than the rate of sodium aluminate addition. Under these conditions, mature seeds usually occur after 12 hours at 100° F. See U.S. Pat. No. 4,631,261 for a detailed description of the procedure used in the preparation of the seeds.

The reflux reactor was closed and continuously stirred during addition of ingredients (calcined microspheres composed of roughly equal parts of metakaolin and kaolin calcined to undergo the exotherm, with a sodium silicate binder) and a solution phase composed of sodium silicate, caustic and "quenched" seed. The ingredients were heated to 210°-214° F. to initiate the crystallization reaction and were maintained at that temperature, with stirring, for 21 hours. At that time, a small portion of the microspheres was removed from the crystallization reactor, washed with a 1:1 ratio of deionized water to microspheres and dried. The criterion for a satisfactory crystallization result was that the washed and dried microspheres contained at least 55% by weight Y-faujasite, having a unit cell size of 24.70 Angstrom units or below.

EXAMPLE II

In this example, microspheres (B) comprising a minor amount of kaolin calcined to undergo the exotherm relative to metakaolin and having greater macroporosity than microspheres (A) of EXAMPLE I were prepared as follows:

A slurry was prepared by mixing 40 parts by weight of Satintone ® No. 1 calcined kaolin, 10 parts by weight of ASP ®600 hydrated high purity kaolin, 50 parts by weight of Satintone ® No. 2 metakaolin, 27.7 parts by weight of a sodium disilicate solution (analyzing 28.4% by weight SiO$_2$, 15.2% by weight Na$_2$O), and 139.1 parts by weight of H$_2$O. The slurry was spray dried and calcined in a muffle furnace at 1,350° F. for 2 hours using about a one inch bed of the spray dried microspheres. The calcination was carried out to convert the hydrated kaolin in the microspheres to metakaolin, resulting in a ratio of metakaolin to kaolin calcined through the exotherm of nearly 1.5.

Solutions of mature amorphous quenched seeds were prepared as in Example I. A reflux reactor was closed and continuously stirred during addition of ingredients (the calcined microspheres and a solution phase composed of sodium silicate, caustic and "quenched" seeds). The ingredients were heated to 210°-214° F. to initiate the crystallization reaction and were maintained at that temperature, with stirring, for 21 hours. At some time, the crystallization was terminated the microspheres were filtered and rinsed 2:1 with deionized water. After drying, the microspheres were analyzed to confirm a satisfactory crystallization, where the criterion was at least 70% by weight Y-faujasite having a unit cell size of 24.73 Angstrom units or below.

We have found that because of the greater porosity and therefore poorer integrity of the modified microspheres, it was preferred to use a higher level of binder (sodium silicate) than in typical microspheres A.

EXAMPLE III

For purposes of comparison, tests similar to those of EXAMPLE II were carried out but varying the proportion of components in the slurry feed to the spray drier and also varying the solids of the slurry during crystallization.

In one comparative preparation the microspheres were modified such that additional nutrients were provided by increasing the ratio of hydrated clay to kaolin calcined through the exotherm in the feed to the spray drier but no additional microsphere macroporosity was provided. In a second comparative preparation, additional macroporosity was provided by increasing the amount of calcined clay in the mix before spray drying but no additional nutrients were provided (i.e., the amount of metakaolin present after calcination was held constant).

EXAMPLE IV

Calcined microspheres prepared in previous examples were ultrastabilized to prepare octane catalysts, including A, A' and B, as follows:

After crystallization a batch of each slurry from the previous examples was filtered and rinsed with water employing about 2 grams water per 2 grams crystallized microspheres. Each washed filter cake containing zeolite in sodium form was initially ammonium exchanged twice, each time by slurrying the crystallized microspheres at 35% solids in a 3N NH$_4$NO$_3$ solution maintained at pH 3.0-3.5 by addition of HNO$_3$, heating with stirring to 180° F. for twenty minutes, and filtering. After oven drying, samples typically had a sodium content of about 2.5-4.0%, expressed as Na$_2$O and a zeolite unit cell size of about 24.72-24.74 Angstrom units. A 600 g sample of the resulting catalyst intermediate was packed into a covered corderite calcining tray and wetted with 100 ml H$_2$O to provide steam during calcination. The sample was then placed in a hot oven and calcined at 700° F. for 2 hours, allowed to cool and then calcined at 1,100° F. for 2 hours in the case of Catalyst A and 900° F. for 2 hours in the case of A' and B. After calcination, the catalyst intermediate was again ammonium exchanged 2-3 times by the same procedure as before at pH 3.0-3.5. In the case of Catalyst A, the calcined reexchanged microspheres were flash dried and recovered. In the case of Catalysts A' and B, after drying the catalyst intermediate was packed into a covered corderite tray and wetted to 25% moisture, placed in a hot oven, and calcined a second time at 1,000° F. for 2 hours. Thus, Catalyst A' and Catalyst B were prepared using a two step calcination which seems to be highly advantageous when making Catalyst B, presumably because at this point in the process, the catalyst precursor microspheres have a lower content of kaolin calcined through the exotherm than prior art microspheres and are less stable in terms of their ability to survive calcination in the presence of steam.

Data in Table 1 compares the composition of microspheres A and the modified microspheres B before spray drying and after calcination. Microspheres A contain about 55% calcined kaolin (all of which was calcined through the exotherm) before spray drying. The modified microspheres B contained about 85% calcined kaolin (which was a mixture of metakaolin and kaolin calcined through the exotherm) before spray drying. Since calcined clay does not space (pack) as well as hydrated clay during spray drying, the modified microspheres contained substantially more macroporosity. Thus, the modified microsphere had substantially more room for zeolite growth. Microspheres A contained about 34% metakaolin after calcination; the modified microspheres B contained ca. 55% metakaolin. Since metakaolin provides the bulk of the reactive alumina for zeolite synthesis, the modified microsphere contained substantially more nutrients for zeolite growth.

Data in Table 1 indicate that increases in the amount of calcined clay in the slurry before spray drying and increases in the amount of metakaolin in the microspheres after calcination result in more nutrients and greater porosity. These changes have eliminated the two constraints that otherwise generally preclude crystallization to greater than about 60% zeolite.

Table 2 compares formulations for the [EXAMPLE I] base and modified microspheres [EXAMPLE II] preparations, as well as two other preparations [EXAMPLE III] evaluated for purposes of comparison. Note that of the four formulations, only the formulation in which both additional nutrients and additional porosity was provided achieved zeolite levels of 70%. Data in Table 2 therefore indicates that zeolite growth is restricted in microspheres A by both nutritional and spatial limitations.

FIG. 2 summarizes the activity of blended Catalyst A/Catalyst A' and Catalyst B as a function of crystallization solids and calcination method. The left hand side of the cube in FIG. 2 represents catalysts of the A/A' type, based on microspheres containing a greater amount of clay calcined through the exotherm than of metakaolin. The right hand side of the cube represents the microspheres of this invention, containing greater amounts of metakaolin and more porosity. The bottom, or base of the cube, are catalysts worked up into finished products using the single pass calcination procedure (as used to make Catalyst A). The top of the cube represents those catalysts that were made using the double calcination procedure used to make catalysts A' and B. Finally, the front face of the cube represents; samples in which zeolite was crystallized in a high solids slurry (i.e. wt. $H_2O$/wt. microsphere in the 2.1 to 2.6 range) while the back face represents those crystallized in a low solids slurry (i.e. wt. $H_2O$/wt. microsphere in the 3.1 to 4.4 range). These eight catalyst preparations, then, allow one to separate and quantify the effects of the three variables of interest (microsphere type, crystallization solids, and calcination procedure) on finished catalyst activity (reported as MAT values in FIG. 2).

From information in FIG. 2, it also appears that the full activity potential of the Catalyst B as indicated by its zeolite content can only be realized when it is crystallized at lower solids than used to crystallize Catalysts A and A'. FIG. 2 also shows that the highest activity achieved is with the low solids, double pass calcination, Catalyst B preparation.

Table 3 sets stoichiometry used for various crystallizations.

Tables 4 and 5 compare physical and chemical properties of typical Catalyst A (or A') and Catalyst B. Note the higher total surface area, lower matrix surface area, lower microporosity, and higher silica content of Catalyst B, all consistent with its higher zeolite to matrix content.

Table 6 compares product yields at 70% conversion, on MAT (microactivity test) runs in which the cracking components were diluted 1:1 with microspheres of calcined clay (free from zeolite) (See U.S. Pat. No. 4,493,902) prior to testing. The surface are of the microspheres of calcined clay was below 10 $m^2$/g. All catalysts were steamed for four (4) hours/100% steam at temperatures ranging from 1,350° F. to 1,500° F. prior to testing as described in U.S. Pat. No. 4,493,902. Conditions used in the MAT tests are also described in this patent, except the gas oil used in the tests described in this application was either CTSGO 75 or CTSGO 175 each having the following properties:

| SAMPLE - CTSGO - 75 GASOIL | | | |
|---|---|---|---|
| | | | Replicate Analyses |
| HYDROCARBON ANALYSIS: | | | |
| API GRAVITY (@ 60° F.) | | 28.21 | 28.0 |
| RAMSBOTTOM CARBON (wt %) | | .39 | 0.26 |
| SIMULATED DISTILLATION - | | °F. | |
| | 1BP | 370 | 415 |
| | 10% | 525 | 550 |
| | 20% | 585 | 609 |
| | 30% | 637 | 659 |
| | 40% | 686 | 707 |
| | 50% | 735 | 756 |
| | 60% | 784 | 807 |
| | 70% | 833 | 864 |
| | 80% | 890 | 932 |
| | 90% | 959 | 1,030 |
| | 95% | 1,010 | 1,066 |
| ANALYTICAL ANALYSIS: | | | |
| TOTAL SULFUR (wt %) | | 0.61 | 0.59 |
| METALS - | Na(ppm) | 8.6 | — |
| | Fe(ppm) | 2.2 | <1 |
| | Cu(ppm) | .1 | 3 |
| | Mi(ppm) | .6 | <1 |
| | V(ppm) | 1.1 | <1 |
| OTHER ANALYSIS: | | | |

-continued

| | | | |
|---|---|---|---|
| TOTAL NITROGEN | (ppm) | 806 | 903 |
| BASIC NITROGEN | (ppm) | 297 | 739 |
| POUR POINT | (F) | 95 | — |
| PARRAFFINS | (wt %) | 41.72 | — |
| NAPHTHENES | (wt %) | 27.87 | — |
| AROMATICS | (wt %) | 30.41 | — |
| VISCOSITY | (@ 210° F.) | 4.015 | — |
| | (@ 100° F.) | 26.053 | — |
| Aniline Point | | 188.5 | — |

| SAMPLE - CTSGO 175, GASOIL | | |
|---|---|---|
| | High | Low |
| API @ 60° F. | 29.4 | 29.2 |
| Ramsbottom C | 0.30 | 0.21 |
| Total Nitrogen ppm | 629 | 593 |
| Basic Nitrogen ppm | 258 | 241 |
| % Sulfur | 0.52 | 0.47 |
| Pour Point (°F.) | 79.0 | 73.0 |
| Aniline Point (°F.) | 180.0 | 176.0 |
| Viscosity 210° F. | 15.551 | 14.99 |
| 100° F. | 3.35 | 3.29 |
| MOL Wt. | 274 | 255 |
| Flash Point (°F.) | 212 | 206 |
| Metals (ppm) | | |
| Ni | 0.3 | 0.2 |
| V | 0.3 | 0.2 |
| Fe | 6.51 | 2.94 |
| Na | 7.77 | 4.07 |
| Cu | 0.1 | 0.1 |
| Pb | 0.1 | 0.1 |
| Sim Dis °F. | | |
| (ISTD) IBP | 359 | 304 |
| 10 | 507 | 488 |
| 20 | 580 | 567 |
| 30 | 638 | 625 |
| 40 | 682 | 672 |
| 50 | 719 | 710 |
| 60 | 756 | 748 |
| 70 | 794 | 786 |
| 80 | 836 | 829 |
| 90 | 890 | 885 |
| FBP | 1,004 | 1,000 |

From data in Table 6 it can be shown that coke make of blended Catalyst B was about 10% lower than similarly blended Catalyst A. No other differences were noted, although testing by another laboratory of similar materials revealed reduced dry gas make as well as reduced coke for blended Catalyst B as compared to similarly blended catalyst A.

We believe that it may be possible to produce modified microspheres with acceptably high macroporosity and suitable acid solubility without using the concept of a spray drier feed containing large amounts of calcined clay. Coarser sized hydrated kaolin clays, like calcined clays, do not pack well during spray drying. Thus, it may be possible to utilize the same amount of clay calcined through the exotherm as used in illustrative examples (e.g., 37%), eliminate the metakaolin, and replace the fine sized hydrated clay (e.g., kaolin that is ca. 80% −2 micron) with a hydrated kaolin that is coarser than one we prefer to use when employing a spray dryer feed containing kaolin calcined to undergo the exotherm, metakaolin of hydrated kaolin. Examples of a coarser hydrated clay are NOKARB TM and ASP®400 kaolin which have an average particle size in the range of about 4.5 to 5.7 microns and contains about 16 to 33% by weight of particles finer than 2 microns. ASP®400 kaolin and similar coarse particle size fractions of kaolin clay crudes are characterized by the predominance of booklets or stacks of kaolin plates. Use of coarse particle size fractions of kaolin clay will still provide the desired amount of metakaolin in the calcined microspheres, but would reduce the amount of expensive calcined clay in the spray drier feed.

The Catalyst B and other octane catalysts of the invention are useful in cracking catalyst formulations in which higher activity and/or lower coke and gas make are desired, while maintaining the excellent octane potential of Catalyst A and A'. Rare earth versions of catalysts of this invention, post treated after crystallization by ion-exchange with high levels of rare earth, e.g., by procedures such as described in the '902 patent, are useful when exceptionally high activity is sought and the octane rating of the FCC gasoline produce is not of prime importance.

Conditions useful in operating FCC units utilizing catalysts of the invention are well known in the art and are contemplated in using the catalysts of the invention. These conditions are described in numerous publications including Catal. Rev. - SCI. ENG., 18 (1), 1-150 (1978), which is incorporated herein by cross-reference.

The following test was used for the determination of the total acid solubility of microspheres composed of metakaolin or of mixtures of fully calcined kaolin and metakaolin. In carrying out the test, a one (1) gram of sample is leached with 50% HCl, the residue filtered ignited at 1000° C., and weighed. The percent acid solubility is calculated from the weight loss. A loss on ignition is obtained to correct for volatile constituents.

To determine loss on ignition (LOI) the following apparatus is used:

1. Porcelain crucibles with covers, wide form 30 ml capacity;
2. Muffle furnace, with temperature controller and indicator, that can be operated to 1000° C. or higher;
3. Dessicator, with active desiccant; and
4. Analytical balance, sensitivity to 0.1 mg.

The procedure for determining LOI follows:
1. Prepare a porcelain crucible and cover for use by igniting at 1000° C. for 10 minutes and cooling in the desiccator.
2. Transfer approximately 1 g of sample into the tared crucible and weigh accurately to within 0.1 mg.
3. Preignite in the muffle furnace at 400° C. for 30 minutes, the increase muffle temperature and continue ignition at 1000° C. for 1 hour.
4. Remove crucible to desiccator, cool to room temperature and weigh.
5. Calculate the net weight loss of the sample and convert to %.

$$\% \, LOI = \frac{\text{grams lost during ignition}}{\text{initial sample weight (g)}} \times 100$$

Acid solubility measurements, correct for LOI, use the following apparatus:
1. Beakers, Pyrex, 250 ml capacity with watch glasses and stirring rods.
2. Rubber policeman.
3. Crucibles, porcelain, Selas filtering, 30 ml capacity, medium frit, Fisher Cat. No. 08-227-1B. Note: See procedure (1) before tare is obtained.
4. Water crucible holders, Fisher Cat. No. 08-285, or equivalent.
5. Flask, vacuum filtering, 1000 ml capacity, Fisher Cat. No. 10-180F.
6. Hot plate, Lindberg, Fisher cat. no. 11-499c or equivalent.
7. Analytical balance, sensitivity to 0.1 mg.
8. Desiccator, with active desiccant.
9. Muffle furnace, with temperature controller and indicator, that can be operated to 1000° C. or higher.
10. Ultrasonic cleaner, benchtop, Fisher Cat. No. 15-337-1 or equivalent.

Reagents (All ACS Reagent Grade)
1. Hydrochloric acid, HCl, concentrated, 37%.
2 Nitric acid, HNO$_3$, concentrated, 70%.

Special Solutions
1. Hydrochloric acid, HCl, 5% (V/V).
2. Hydrochloric acid, HCl, 1:1 (V/V)

Procedure
1. Rinse Selas porcelain crucibles with 5% HCl followed by deionized water under suction. Predry on in muffle oven at 400° C. for 15 minutes. Transfer to a muffle furnace set at 1000° C. and ignite for 10 minutes. Remove to desiccator, cool to room temperature, and weigh on analytical balance to obtain tare.
2. Weigh 1 g±0.1 mg of sample and transfer to a 250 ml beaker fitted with a stirring rod and watch glass.
3. Add 50 ml of 1:1 HCl.
4. Transfer beaker and contents to hot plate, heat to boiling, continue to boil for 1 hour.
5. Remove beaker from hot plate and cool.
6. Filter through selas porcelain crucibles.
7. Carefully police beaker, watch glass, and stirring rod, and quantitatively transfer the residue to the Selas porcelain crucible using 5% HCl.
8. Wash the residue 10 times with 20 ml volumes of hot 5% HCl, letting the crucible such dry each time. Note. The filtrate must be clear. If not, this analysis must be discarded and repeated.
9. Transfer the Selas porcelain crucible to muffle oven set at 400° C.
10. Ignite crucible at 400° C. in a muffle oven for 15 minutes.
11. Transfer the Selas porcelain crucible to a muffle oven set at 1000° C. and continue ignition for 30 minutes.
12. Remove crucible to a desiccator, and cool to room temperature.
13. Weigh crucible and record as "crucible plus residue".
14. Calculate the % Total Acid Solubility (TAS) as follows:

All weights in gram:

$$TAS = \frac{(SW(vf) - RW) \times 100}{\text{sample weight } (vf)}$$

where
RW = (crucible plus residue) − (crucible tare)
and $$SW(vf) = \frac{\text{Sample Weight} \times (100 - LOI)}{100}$$

A modification of ASTM Standard Test Method D-4365-85 was used for determining the zeolite surface area of catalysts and covers the determination of the total area of catalyst ascribable to micropores, the matrix area of the catalyst and the zeolite area of the catalyst. P/Po values of 0.08, 0.10, 0.14, 0.17 and 0.20 were used for collecting the data which was used to calculate the de Bock t-plot surface area for the matrix. P/Po values of 0.02, 0.03 and 0.04 were used to calculate total surface area. The modification of D-4365-85 was not to use the 0.975 correction as specified in paragraphs 11.4 and 11.14 when using the formula micropore area=-BET area−t area in paragraph 11.15.

TABLE #1

Effect of the Amount of Calcined Clay In The Mix Before Spray Drying and the Amount of Meta-Kaolin After Calcination on Properties of the Modified Microsphere

|  | Base | Modified MS |
|---|---|---|
| Before Spray Drying[1] | | |
| Calcined Clay | | |
| Spinel | 55.4 | 36.9 |
| Meta-kaolin | 0 | 46.2 |
| Subtotal | 55.4 | 83.1 |
| Hydrous Clay | 36.9 | 9.2 |
| Sodium Silicate Binder | 7.7 | 7.7 |
| After Calcination[2] | | |
| Meta-kaolin | 33.5 | 54.8 |
| Spinel | 58.4 | 37.4 |
| Binder | 8.1 | 7.8 |
| Subtotal | 100 | 100 |
| Acid Solubles[3] | 18.2 | 28.0 |
| Macro-porosity[4] | 0.48 | 0.65 |

[1]Dry Basis
[2]VF Basis
[3]Engelhard Test Method 1540.13
[4]600–20K Å diameter pores by Hg

TABLE #2

Effect of Composition of Feed Slurry on Catalyst Properties

| | Base | Microspheres Modified For More: | | |
|---|---|---|---|---|
| | | Porosity | Nutrients | Porosity & Nutrients |
| Before Spray Drying | | | | |
| Calcined Clay | | | | |
| Meta-kaolin | 0 | 32.3 | 0 | 46.2 |
| Spinel Kaolin | 55.4 | 55.4 | 36.9 | 36.9 |
| Subtotal | 55.4 | 87.7 | 36.9 | 83.1 |
| Hydrous Clay | 36.9 | 4.6 | 55.4 | 9.2 |
| After Calcination | | | | |
| Meta-kaolin | 33.5 | 36.5 | 51.6 | 54.8 |
| Spinel | 58.4 | 55.7 | 40.0 | 37.4 |
| Acid Soluble Alumina | 18.2 | 19.6 | 27.2 | 28.0 |
| Macro-porosity | 0.48 | 0.63 | 0.47 | 0.65 |
| After Crystallization | | | | |
| Maximum Zeolite | 52 | 57 | 61 | 70 |
| Surface Area[1] | 660 | 659 | 624 | 761 |

[1] multi-point BET at low P/Po range

TABLE #3

Comparison of Stoichiometry of Crystallizations Used for High Zeolite and Control Preparations At Various Solids Levels

| | Control | High Zeolite |
|---|---|---|
| Low Solids | | |
| Microspheres/Na2O | 2.2 | 1.7 |
| SiO2/Na2O | 1.9 | 2.1 |
| SiO2/Al2O3 | 235 | 339 |
| H2O/Na2O | 7.1 | 7.1 |
| Zeolite Growth, % | 64 | 74 |
| Medium Solids | | |
| Microspheres/Na2O | 2.9 | 3.0 |
| SiO2/Na2O | 1.7 | 1.9 |
| SiO2/Al2O3 | 169 | 179 |
| H2O/Na2O | 7.5 | 7.5 |
| Zeolite Growth, % | 64 | 79 |
| High Solids | | |
| Microspheres/Na2O | 3.5 | 3.7 |
| SiO2/Na2O | 1.6 | 1.7 |
| SiO2/Al2O3 | 125 | 130 |
| H2O/Na2O | 7.4 | 7.7 |
| Zeolite Growth, % | 66 | 72 |

Note: SiO2, Al2O3, and Na2O include seeds but exclude microspheres.

TABLE #4

Physical Properties of Octane Catalysts of Varying Zeolite Content

| | Experimental Catalyst | Control |
|---|---|---|
| Zeolite Index (%) | 45–50 | 35–40 |
| Unit Cell Size (A) | 24.60 | 24.60 |
| Apparent Bulk Density (g/cc) | 0.80 | 0.85 |
| Total Surface Area (m²/g) | 580 | 480 |
| Matrix Surface Area (m²/g) | 115 | 130 |
| Zeolitic/Matrix Surface Area Ratio | 4.0 | 2.7 |
| Attrition Resistance | | |
| EAI, wt %/sec | 0.6 | 0.4 |
| Roller | 7 | 6–7 |
| N2 Pore Size Distribution | | |
| 25–100 A (cc/g) | 0.10 | 0.14 |
| 25–600 A (cc/g) | 0.12 | 0.15 |
| Total (cc/g) | 0.31 | 0.27 |
| Hg Pore Size Distribution | | |
| 40–100 A (cc/g) | 0.08 | 0.12 |
| 40–600 A (cc/g) | 0.12 | 0.14 |
| Total (cc/g) | 0.30 | 0.26 |

TABLE #5

Chemical Properties of Octane Catalysts With Varying Zeolite Content (All Values Are wt % VF Basis)

| | Experimental Catalyst | Control |
|---|---|---|
| Al2O3 | 33.0 | 40.0 |
| SiO2 | 65.0 | 57.0 |
| Na2O | 0.3 | 0.3 |
| TiO2 | 1.3 | 1.7 |
| Fe2O3 | 0.3 | 0.4 |

TABLE #6

Selectivities of Octane Catalysts of Varying Zeolite Content

| | Experimental Catalyst | Control |
|---|---|---|
| Dry Gas (C2−) | 1.8 | 1.8 |
| LPG (C3–C4) | 14.4 | 14.2 |
| Gasoline (C5-421° F.) | 50.0 | 49.7 |
| LCO (421–602° F.) | 18.2 | 18.2 |
| Bottoms (602+° F.) | 11.8 | 11.8 |
| Coke | 3.8 | 4.3 |

All values are wt %, oil feed basis
Mats were run on 1:1 blends of cracking catalyst and inert MS

We claim:

1. The method for making a high zeolite content fluid catalytic cracking catalyst comprising the steps of:

(a) forming an aqueous slurry containing 5–35 parts by weight hydrated kaolin clay, 30–40 parts by weight kaolin clay that has been calcined through its characteristic exotherm and 17–53 parts by weight of metakaolin, the proportions of kaolin clay that has been calcined through its exotherm being from 1 part by weight to from about 1.2 to 2 parts by weight metakaolin after step (c) below (b) spray drying the aqueous slurry to obtain microspheres;

(c) calcining the microspheres obtained in step (b) at a temperature and for a time sufficient to convert the hydrated kaolin clay in the microspheres substantially to metakaolin, but insufficient to cause metakaolin or hydrated kaolin to undergo the characteristic kaolin exotherm and to provide microspheres of calcined clay having an acid-solubility in the range of 22–42% and a Hg pore volume between 0.50–0.70 cc/g;

(d) mixing the microspheres obtained in step (c) with sodium silicate and water to obtain an alkaline slurry of microspheres of calcined clay in an aqueous solution containing sodium silicate;

(e) heating the slurry of microspheres of calcined clay to a temperature and for a time sufficient to crystallize at least about 70% by weight Y-faujasite in the microspheres, said Y-faujasite being in the sodium form.

2. The method of claim 1 wherein the slurry in step (a) also contains a binder effective amount of sodium silicate.

3. The method of claim 1 wherein the clay that has been calcined at least substantially through its characteristic exotherm contains substantially no mullite.

4. The method of claim 1 wherein the kaolin calcined through the exotherm is present in amount in the range of about 30–40% by weight in step (a).

5. The method claim 1 wherein the sodium silicate is present in amount in the range of 8–15% by weight in step (a).

6. The method of claim 1 wherein the solids content of the slurry is in the range of 33 to 46% in step (a).

7. The method of claims 1 wherein the sodium silicate mixed with the microspheres in step (d) is in amount such that microspheres having a $SiO_2/Al_2O_3$ molar ratio of about 2.7 to 4.0 are obtained in step (e).

8. The method of claim 1 wherein sodium aluminosilicate seeds are included in the slurry formed in step (d).

9. The method of claim 1 wherein the weight ratio of water to clay microspheres at the beginning of the crystallization process of step (e) is about 2.1 to 4.4.

10. The method of claim 1 wherein the molar ratio of $Na_2O/SiO_2$ in the solution phase at the beginning of the crystallization process of step (e) is about 0.46 to 0.57 and the weight ratio of $SiO_2$ in the solution phase to the clay microspheres at the beginning of the crystallization process of step (e) is about 0.46 to 1.20.

11. The method of claim 1 wherein at least 75% by weight Y-faujasite is crystallized in the microspheres in step (e).

12. The method of claim 1 including the steps of:
(a) separating the microspheres containing at least 70% by weight Y-faujasite from at least a major portion of its mother liquor;
(b) replacing sodium cations in the microspheres separated in step (e) with ammonium ions;
(c) calcining the microspheres from step (a) in the presence of steam to facilitate release of sodium ions;
(d) further exchanging the microspheres with ammonium ions to reduce $Na_2O$ content to below 1%; and
(e) further calcining the microspheres to reduce the unit cell size of the zeolite.

13. The method of making a fluid cracking catalyst comprising the steps of:
(a) making coherent microspheres of calcined kaolin clay, said microspheres consisting essentially of about 55% by weight metakaolin and about 30 to 40% by weight kaolin clay that has been calcined at least substantially through its characteristic exotherm, said microspheres having an acid-solubility in the range of 22–42% and a Hg pore volume between 0.50–0.70 cc/g; spray drying a mixture of 5–35 parts by weight hydrated kaolin clay, 17.53 parts by weight metakaolin and 30–40 parts by weight of kaolin clay calcined to undergo the exotherm and sodium silicate as a binder, thereby producing microspheres:
(b) calcining said microspheres to form calcined microspheres having an acid-solubility in the range of 22–42% and a Hg pore volume between 0–50–0.70 cc/g;
(c) mixing the microspheres of step (b) with water soluble sodium silicate and water to obtain an alkaline slurry of microspheres of calcined clay in an aqueous solution containing sodium silicate, said sodium silicate being provided in an amount such that microspheres having an $SiO_2/Al_2O_3$ molar ratio of about 2.7 to 4.0 are obtained in step (g) below;
(d) adding zeolite initiator to the slurry of calcined microspheres before step (e) below;
(e) heating the slurry of microspheres of calcined clay to a temperature and for a time sufficient to crystallize more than 70% by weight Y-faujasite in the microspheres, said Y-faujasite being in the sodium form;
(f) separating the microspheres containing at least about 70% by weight Y-faujasite from at least a major portion of its mother liquor; and
(g) replacing sodium cations in the microspheres separated in step f with ammonium or rare earth cations of both to produce catalyst microspheres analyzing more than 95% by weight of $SiO_2$ and $Al_2O_3$, a $SiO_2/Al_2O_3$ ratio of about 2/1, a unit cell size of about 24.60 Angstrom units or below, zeolite/matrix surface area ratio of about 4/1, and an EAI value below 1%/sec and further characterized by a Hg pore size distribution of about 0.08 cc/g of pores in the range of 40–100 Angstrom units and about 0.12 cc/g of pores in the range of 40–600 Angstrom units.

14. The method of claim 12 wherein more than 72% by weight Y-faujasite is crystallized in the microspheres in step (d) and the ratio of microspheres to water at the beginning of step (b) is in the range of 2.1 to 4.4.

15. The fluid catalytic cracking catalyst made by the method of claim 1.

16. The fluid catalytic cracking cracking catalyst made by the method of claim 12.

17. A fluid catalytic cracking catalyst for producing high octane gasoline comprising microspheres analyzing more than 95% by weight of $SiO_2$ and $Al_2O_3$, a unit cell size of about 24.60 Angstrom units or below, a total surface area above 500 $m^2/g$, a zeolite/matrix surface area ratio of about 4/1, and an EAI value below 1%/sec.

18. The catalyst of claim 17 has a $SiO_2/Al_2O_3$ weight ratio of about 2/1.

19. The catalyst of claim 17 which is characterized by a Hg pore size distribution of about 0.08 cc/g of pores in the range of 40–100 Angstrom units and about 0.12 cc/g of pores in the range of 40–600 Angstrom units.

20. The cracking catalyst of claim 17 which is present in admixture with substantially catalytically inert microspheres of calcined kaolin clay free from zeolite.

21. The cracking catalyst of claim 20 wherein said microspheres of calcined clay have a surface area below 10 $m^2/g$.

22. The cracking catalyst of claim 17 which is blended with about an equal weight of microspheres of substantially catalytically inert microspheres of calcined kaolin clay or microspheres obtained by calcining a mixture of kaolin clay and a source of magnesium oxide.

23. The method of claim 1 wherein after step (e) sodium cations in the microspheres are ion-exchanged with ammonium or a combination of ammonium and rare earth cations to provide a fluid cracking catalyst analyzing more than 95% by weight of $SiO_2$ and $Al_2O_3$, a $SiO_2/Al_2O_3$ ratio of about 2/1, a unit cell size of about 24.60 Angstrom units or below, a total surface area above 500 $m^2/g$, a zeolite/matrix surface area ratio of about 4/1, and an EAI value below 1%/second and further characterized by a Hg pore size distribution of about 0.08 cc/g of pores in the range of 40–100 Angstrom units and about 0.12 cc/g of pores in the range of 40–600 Angstrom units.

* * * * *